Dec. 30, 1952  J. MALECKI  2,623,391
MEANS OF VAPOR CONCENTRATIONS DETERMINATION
Filed Aug. 22, 1947
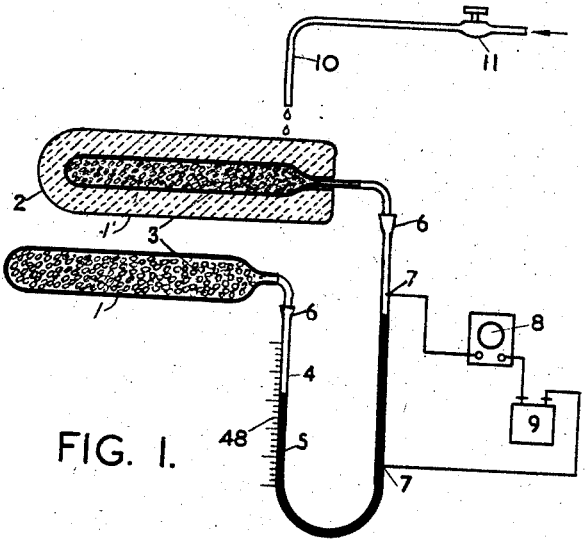
FIG. 1.
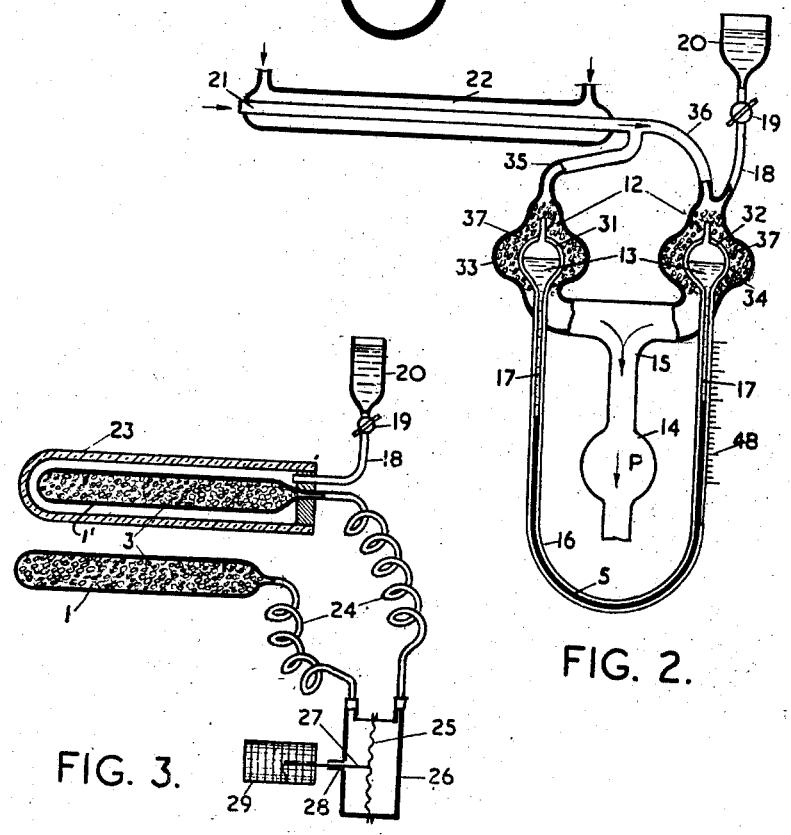
FIG. 2.
FIG. 3.
Jerzy Malecki Patented Dec. 30, 1952

2,623,391

UNITED STATES PATENT OFFICE 2,623,391

MEANS OF VAPOR CONCENTRATIONS DETERMINATION

Jerzy Malecki, London, England

Application August 22, 1947, Serial No. 770,045
In Great Britain September 12, 1946

2 Claims. (Cl. 73—338)

The invention refers to a simple and sensitive means of determination of vapour concentrations in an atmosphere with the well known means of wet and dry bulbs surrounding two temperature responsive means which means is widely used in humidity determinations. Although the largest application of the present invention would be humidity determinations however the same means may be successfully applied and the determination of comparatively higher (for instance above 10-20% per volume) concentrations of various vapours in various atmospheres, like for instance ethylalcohol, bezone, and other organic liquids in air or neutral gases.

The invention contemplates an apparatus for indicating relative humidities comprising a dry bulb and a wet bulb unit, both said units being charged with a multiphase system of a volatile substance, a sheath enveloping the wet bulb, said sheath comprising a body of porous material to retain a wetting agent, a differential pressure responsive indicating device, and conduit means connecting said bulbs in differential relation to said device, whereby the relative humidity may be indicated in response to pressure differentials existing between the respective gas phase of said multiphase systems due to temperature differences between the bulbs.

The differential thermometer consists for instance of two closed containers, separated by a membrane or a column of liquid. Both containers enclose multiphase systems of the same composition, in which a liquid or solid phase is in equilibrium with a gaseous phase. Under the influence of the temperature difference between both containers, the equilibrium in that container where the temperature has changed is disturbed and consequently the pressure of gaseous phase, changes; this actuates the movement of the membrane or liquid column enabling the measurement of the temperature change.

One end of this differential thermometer should be enveloped in a porous substance, as for instance, a wick, porous glass, ceramics, etc., in the form of a solid cover or granules. In the case of the solid cover, it may be loosely attached to the thermometer end, and imbibed with the liquid phase of the determined vapour as for instance is usually done in the present type wet and dry bulb hygrometers.

I suggest furthermore, a new wet bulb construction, which gives a better thermal conductivity for the heat changes to be transmitted toward the temperature responsive substance and thus secures a better sensitivity and quicker response to vapour concentration changes.

The new construction may be applied also in all present wet and dry bulb hygrometers; it consists in sintering, soldering or glueing of a porous layer around the respective end of the thermometer which will assure an intimate contact with the container of the responsive substance. The porous layer may be simply well adjusted, for instance by grinding or polishing, to have inside the exact shape of the bulb. It may consist of ceramic, glass, metal or plastic preferably of similar thermal expansion coefficient as the material from which the said container is made. In the case of glass this porous layer may be made, for instance, by the usual "sinter glass" technique. In the case of metal it may be made for instance, by the usual "powder-metallurgy" technique. In all cases it is preferable that the outer layer should be more dense and the inner more coarse, in order to allow an even distribution of water supply.

In case of the use of granulated solid substance around the wet and dry bulb, both substances should be preferably similar with regard to their specific heat, heat conductivity, quantity and specific weight. The use of granulated solid around both dry and wet bulb increases the sensitivity of the apparatus, but if it is not necessary, then only the wet bulb may be surrounded with granulated solid. The wet and dry bulb may be placed directly in the controlled place, for instance a drier, like it is usually done now with wet and dry bulb hygrometers. However the controlled atmosphere may be also pumped through conduits to the apparatus placed externally at some distance from the controlled place. In the latter case it is preferable to heat the conduits to a temperature higher than that in the controlled place in order not to allow the determined vapour to condense in said conduits.

The multiphase systems should be so chosen that the quantity of gas or vapour given off by the multiphase system under the influence of the smallest temperature difference which the differential thermometer should detect (so-called sensitivity) should develop a sufficient pressure inside the multiphase system container, giving such a displacement of the detecting, indicating, recording, or regulating means (membrane, mercury column, etc.), which is easily detectable by the operator, for instance, ½–1 millimeter when looking without magnifying glass. For instance, if the required sensitivity is 0.1° C. and when the working temperature of the thermometer is that of room temperature, ethylamine is a suitable liquid because it is a substance giving at room temperature and at a 0.1° C. temperature difference a rise of vapour pressure of 2.7 mm. of mercury. If, however, the working temperature of the thermometer is approximately 60° C. (for instance in driers) and the required sensitivity is that of 0.1° C. then the methyl alcohol may be for instance, used. In general, when the highest possible sensitivity is required, it is preferable that the boiling point (at the pressure existing inside of the differential thermometer) of the liquid being used, or the region of temperature at which the maximum amount of gas or vapour is given off (at the pressure existing inside of the differential thermometer), by the adsorbent (for instance, active coal or dissolving liquid), should be in the neighborhood of 20° C. of the working temperature of the differential thermometer. The exact form of the described differential thermometer may vary. For instance, in case of the indicating or recording device being in immediate proximity of the controlled place the most suitable and simple form may consist, for instance, of a vertically placed U-tube in the ends of which some suitable liquid is placed, but not filling the space entirely. The vapour pressure of this liquid actuates the movement of the mercury, which is placed in the centre portion of the U-tube. The detecting, indicating, recording or regulating devices may consist of an impermeable membrane, or a U-tube filled with mercury, etc. In case a very high sensitivity would be required, then the membrane would consist of a thin and comparatively short (2-3 cm.) mercury column, moveable in a, preferably, horizontal, capillary tube, made for preference of glass, or other insulating material.

When used as an alarming, recording, or regulating, the moving of the membrane or mercury column may cause contacts between the electrodes thus closing an alarming, or recording as well as a regulating electric circuit.

When using mercury in contact with a multiphase system, the substance which is in direct contact with mercury in the presence of electric sparking (which usually occurs when closing or opening the electric circuit) should be preferably of chemically reducing properties to avoid any oxidation of mercury. For instance ethylamine, hydrocarbon, alcohol or similar substances may be used, however ether and like should be avoided.

The multiphase systems may consist of the liquid and its vapours. However, systems also consisting of a solid or liquid sorbent and the sorbed gas or vapour may be used. Thus, for instance, a solution of butane in hexane or of methyl-chloride in some higher boiling alkali-chloride, as well as active silica with adsorbed ammonia or an easily convertible ammoniate compound, like magnesium sulphate ammoniate, may be used. Also, other easily reversible, chemical or physio-chemical compounds between gases or vapours with solid or liquid substances may be used, like the compound of methyl-chloride with calcium chloride, or ammonia with zinc sulphates.

Furthermore, in cases of a distant indicating, recording or regulating, in which the membrane or liquid column is at some distance from the wet and dry bulb, then the transmission of pressure to membrane or liquid column is done by a multiphase system, which generates a gas or a vapour which is not condensible in the cooler parts of the connecting conduits. For instance, there might be used the active coal with adsorbed butane, or the zinc sulphate ammoniate, which generates ammonia upon heating.

The gaseous phase should, preferably, consist of only one adsorbed gas or vapour, without any neutral gases, as, for instance, air. In this way the device responds more readily to the temperature differences, due to the lack of retardation influence of the diffusion through said neutral gas.

In order to make multiphase systems more readily responsive to temperature changes, the containers which enclose these multiphase systems should be, preferably, made of a high thermally conductive metal. In case the mercury column actuates electrically the indicating, recording or regulating devices this part of the device which encloses the mercury column should be made of an insulating material like glass or Bakelite. The joint between the insulating material and the metal should be leakproof and may be made in the usual technical manner (for instance, glass to metal joints). However all glass constructions are quite practicable.

In the drawings, which are shown by the way of examples:

Fig. 1 shows a hygrometer with porous layer 2 sintered on the wet bulb 1' and a U-tube indicator 4, 5, 6, with alarming device 7, 8, 9.

Fig. 2 shows: a hygrometer operating at a distance from the controlled place with controlled atmosphere being drawn through the apparatus by the pump 14.

Fig. 3 shows a hygrometer, having the indicating and recording device 25, 29, with a membrane 25 which is installed at a distance from the dry bulb 1 and wet bulb 1'.

The apparatus shown in Figure 1 comprises two temperature responsive bulbs 1 and 1', a U-tube 4 with mercury column 5 inside and a scale 18 and electrical signalling means 7, 8, 9; one of the bulbs 1 is surrounded by a metallic porous layer 2 sintered to the walls of the bulb. The porous layer is constantly wetted with liquid phase of the determined vapour (for instance water) by means of the pipe 10 fitted with a tap 11.

Both bulbs are preferably introduced directly into the controlled place (for instance a drier) and the vaporisation of the liquid phase from the porous layer 2 around the bulb 1' causes a drop of temperature of the wet bulb below that of the dry bulb. The same multiphase system 3 (for instance active coal with adsorbed ethylamine) is enclosed in both bulbs 1 and 1'. Thus created difference in temperature causes difference in vapour pressures of ethylamine over active coal in both bulbs and consequently the mercury 5 in the U-tube is shifted and its movement may indicate on the attached scale 48 the determined vapour concentration (for instance humidity). At some concentration the electrical circuit from the battery 9 through the alarming bell 8 and mercury 5 is closed by contact of mercury 5 with platinum contact 7 and thus the warning is given of undesirable vapour concentration.

The apparatus shown in Fig. 2 comprises a conduit 21, a bifurcated passage element 12, a differential thermometer 16, 17, 31, 32 and a scale 48. The conduit 21 is well insulated or heated above the temperature of the controlled place, for instance by means of the jacket 22. The bifurcated passage element 12 has two inlets 35 and 36, two similar conduits 33 and 34 and an outlet 15 and is arranged so that the atmosphere to be examined can be urged through the conduits by a pump 14.

The differential thermometer 16, 17, 31, 32 consists of a sealed off U-tube, the limbs 17 of which terminate in similar bulbs 31 and 32. Upper parts of the limbs 17 are filled with a multiphase system such as a volatile organic liquid and the vapour thereof such as a hydrocarbon or an alkylamine e. g. ethylamine, methyl alcohol or the like. The similar bulbs are located in the conduits 33 and 34, which are enlarged as shown to accommodate them, the spaces between the bulbs 31 and 32 the conduits 33 and 34 are filled with similar granulated material 37 having preferably the same grain size, specific heat and specific gravity.

The operation is as follows: the pump 14 draws the controlled atmosphere through the conduit 21 and the bifurcated passage element 12 in which the granulated material in one only of the conduits is constantly wetted with the liquid phase of the determined vapour by means of the tube 18 fitted with a tap 19 and reservoir for the liquid 20. The vaporisation of the liquid phase around the bulb 32 causes a drop of its temperature below that of the bulb 31 and this in turn causes the drop of vapour pressure inside of the bulb 32 followed by the shifting of the mercury column 5 which may be measured on the scale 48 to indicate the vapour concentration.

The apparatus shown in Fig. 3 comprises two similar temperature responsive bulbs 1 and 1' and conduits 24 connecting these bulbs with a membrane 25 operating a pen 27 with recording mechanism 29.

The operation of this apparatus is similar to that described with the Fig. 1 with the difference that the pressures from the similar multiphase systems 3 in the bulbs 1 and 1' are transmitted to the membrane 25 enclosed in container 26. The movements of membrane due to differences in said pressures are recorded by the pen 27 emerging outside through a gastight joint 28. The pen records on the revolving drum 29 to indicate the fluctuations of vapour concentrations in time.

The wet bulb is surrounded by a porous cap 23 constantly wetted from a pipe 18 similarly as it is the present practice in the wet and dry bulb hygrometers.

What I claim is:

1. Apparatus for indicating relative vapor concentrations comprising a dry bulb and a wet bulb unit, both said units being charged with a multiphase system of a volatile substance, a sheath enveloping the wet bulb, said sheath comprising a body of porous material to retain a wetting agent, a differential pressure responsive indicating device, and conduit means connecting said bulbs in differential relation to said device, whereby the relative vapor concentration may be indicated in response to pressure differentials existing between the respective gas phases of said multiphase systems due to temperature differences between the bulbs.

2. Apparatus for indicating relative humidity comprising a dry bulb and a wet bulb unit, both said units being charged with an adsorbent, granular material and a multiphase system of a volatile substance, a sheath enveloping the wet bulb, said sheath comprising a body of porous material to retain a wetting agent, said material corresponding in thermal properties to the material of which said wet bulb is made, a differential pressure responsive indicating device, and conduit means connecting said bulbs in differential relation to said device, whereby the relative humidity may be indicated in response to pressure differentials existing between the respective gas phases of said multiphase systems due to temperature differences between the bulbs.

JERZY MALECKI.

REFERENCES CITED

The following references are of record in the file of this patent:

UNITED STATES PATENTS

| Number | Name | Date |
|---|---|---|
| 690,409 | Downs | Jan. 7, 1902 |
| 956,296 | Cramer et al. | Apr. 26, 1910 |
| 1,459,391 | Clausen | June 19, 1923 |
| 1,648,197 | Roodhouse | Nov. 8, 1927 |
| 1,984,946 | Sauerhoff | Dec. 18, 1934 |
| 2,221,633 | Dasher | Nov. 12, 1940 |
| 2,296,030 | Hall | Sept. 15, 1942 |
| 2,321,815 | Hull | June 15, 1943 |
| 2,435,632 | Mabey | Feb. 10, 1948 |